(12) United States Patent
Rollinger et al.

(10) Patent No.: US 7,835,848 B1
(45) Date of Patent: Nov. 16, 2010

(54) COORDINATION OF VARIABLE CAM TIMING AND VARIABLE DISPLACEMENT ENGINE SYSTEMS

(75) Inventors: John Eric Rollinger, Sterling Heights, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 12/434,377

(22) Filed: May 1, 2009

(51) Int. Cl.
*F02D 41/00* (2006.01)
*F01L 9/02* (2006.01)

(52) U.S. Cl. .................. 701/102; 123/90.12; 123/90.13; 123/198 F (58) Field of Classification Search ......... 701/101–105, 701/110, 114, 115; 123/90.12–90.17, 198 A, 123/198 F, 478–481
See application file for complete search history.

(56) References Cited

U.S. PATENT DOCUMENTS

| | | | |
|---|---|---|---|
| 5,408,966 A | 4/1995 | Lipinski et al. | |
| 6,138,636 A | 10/2000 | Kohno et al. | |
| 6,158,212 A | 12/2000 | Tanaka | |
| 6,216,655 B1 | 4/2001 | Yoshiki et al. | |
| 6,382,155 B2 * | 5/2002 | Simpson | 123/90.17 |
| 6,390,039 B2 | 5/2002 | Fuwa | |
| 6,499,449 B2 | 12/2002 | Michelini et al. | |
| 6,588,385 B2 | 7/2003 | Fuwa | |
| 6,591,183 B2 * | 7/2003 | Ishikawa et al. | 701/103 |
| 6,694,948 B2 * | 2/2004 | Glugla et al. | 123/404 |
| 6,705,293 B2 | 3/2004 | Kawasaki | |
| 6,729,283 B2 * | 5/2004 | Simpson et al. | 123/90.17 |
| 6,817,336 B2 * | 11/2004 | Glugla et al. | 123/198 F |
| 6,959,692 B2 * | 11/2005 | Song et al. | 123/406.45 |
| 6,964,270 B2 * | 11/2005 | Janssen et al. | 123/568.26 |
| 7,007,920 B2 | 3/2006 | Nishida et al. | |

(Continued)

FOREIGN PATENT DOCUMENTS

GB 2429074 2/2007

OTHER PUBLICATIONS

Rollinger, John Eric et al., "Coordination of Variable Cam Timing and Variable Displacement Engine Systems," U.S. Appl. No. 12/372,481, filed Feb. 17, 2009, 31 pages.

*Primary Examiner*—Stephen K Cronin
*Assistant Examiner*—Johnny H Hoang
(74) *Attorney, Agent, or Firm*—Allan J. Lippa; Alleman Hall McCoy Russell & Tuttle LLP (57) ABSTRACT

A method of controlling an engine with a first group of cylinders having selectively deactivatable cylinders valves and a variable camshaft timing actuator coupled in a hydraulic system is described. In one example, the method includes during a first mode where the first group of cylinders is activated to carry out combustion cycles, adjusting the hydraulic system with a first gain based on cam timing feedback information and/or maintaining a null position of the actuator by adjusting a control signal to the hydraulic system to within a first value range. During a second mode where the first group of cylinders is deactivated, the method includes adjusting the hydraulic system with a second gain based on cam timing feedback information, the second gain higher than the first gain and/or maintaining the null position of the actuator by adjusting the control signal to the hydraulic system to within a second value range.

19 Claims, 5 Drawing Sheets

U.S. PATENT DOCUMENTS

| | | | |
|---|---|---|---|
| 7,014,167 B2 | 3/2006 | Fuwa | |
| 7,047,922 B2 | 5/2006 | Asada et al. | |
| 7,234,455 B2* | 6/2007 | Pallett et al. | 123/692 |
| 7,246,582 B2 | 7/2007 | Miyakoshi | |
| 7,278,396 B2* | 10/2007 | Leone et al. | 123/431 |
| 7,321,821 B2* | 1/2008 | Kolmanovsky et al. | 701/110 |
| 7,421,836 B2* | 9/2008 | Pallett et al. | 60/274 |
| 7,469,672 B2* | 12/2008 | Andri | 123/198 F |
| 7,487,852 B2* | 2/2009 | Leone et al. | 180/65.28 |
| 7,509,931 B2* | 3/2009 | Degner et al. | 123/90.11 |
| 7,512,471 B2* | 3/2009 | Nakamura et al. | 701/50 |
| 7,546,821 B2* | 6/2009 | Russell et al. | 123/90.12 |
| 7,549,408 B2* | 6/2009 | Russell | 123/481 |
| 7,600,503 B2* | 10/2009 | Russell | 123/481 |
| 7,685,981 B2* | 3/2010 | Matsushima et al. | 123/90.17 |
| 2007/0119391 A1* | 5/2007 | Fried et al. | 123/25 A |
| 2007/0204830 A1* | 9/2007 | Andri | 123/198 F |
| 2007/0205029 A1* | 9/2007 | Leone et al. | 180/65.2 |

* cited by examiner

COORDINATION OF VARIABLE CAM TIMING AND VARIABLE DISPLACEMENT ENGINE SYSTEMS

FIELD

The present application relates to methods for operating a variable displacement internal combustion engine (VDE) in coordination with variable cam timing (VCT).

BACKGROUND AND SUMMARY

Engines operating with a variable number of active or deactivated cylinders may be used to increase fuel economy, while optionally maintaining the overall exhaust mixture air-fuel ratio about stoichiometry. In some examples, half of an engine's cylinders may be disabled during selected conditions, where the selected conditions can be defined by parameters such as a speed/load window, as well as various other operating conditions including vehicle speed. A VDE (Variable Displacement Engine) control system may disable selected cylinders through the control of a plurality of cylinder valve deactivators that affect the operation of the cylinder's intake and exhaust valves. Variable displacement capabilities can be combined with, for example, variable cam timing (VCT), to further improve fuel economy and emissions performance of the vehicle.

However, as recognized by the inventors herein, a potential issue with variable displacement engines may occur when transitioning operation between the various displacement modes, for example, when transitioning from a non-VDE (or full-cylinder) mode to a VDE (or reduced cylinder) mode, and vice-versa. Specifically, the transitions can interact with the motive force used to move the VCT mechanisms. Consequently, a command issued by an engine controller can cause substantially different responses in the VDE mechanism and the VCT mechanism. For example, when a constant cam position is commanded, the position of the VCT phaser may not be suitably maintained during the various VDE valve transitions without adversely affecting gain stability limits.

Thus, the inventors herein have recognized that for an engine equipped with both VCT and variable displacement capabilities, the systems require coordination. Thus, in one example, some of the issues may be addressed by a method of controlling an engine, the engine including a first group of cylinders having selectively deactivatable cylinders valves, the engine further including a variable camshaft timing actuator coupled in a hydraulic system, the method comprising: during a first mode of engine operation where the first group of cylinders is activated to carry out combustion cycles, adjusting the hydraulic system with a first gain based on cam timing feedback information; and during a second mode of engine operation where the first group of cylinders is deactivated, adjusting the hydraulic system with a second gain based on cam timing feedback information, the second gain higher than the first gain. Further, in another example, the method may include during the first mode of engine operation maintaining a null position of a hydraulic actuator by adjusting a control signal to the hydraulic system to within a first value range; and during the second mode of engine operation, maintaining the null position of the hydraulic actuator by adjusting the signal to within a second value range.

In this way, different feedback control gains may be used to control actuation of the variable cam timing while taking into account response effects caused by operation in different cylinder deactivation/activation modes. Further, different null holding signals may also be used for the variable cam timing system that take into account effects caused by operation in different cylinder deactivation/activation modes In one particular example, a variable displacement engine may be configured to operate with cam-torque actuated variable cam timing. A feedback control loop may be configured to convert position errors in VCT positioning into corresponding integral and proportional terms via control gains. The gain characteristics as well as the feed-forward response characteristics may be adjusted based on the status of the selectively deactivatable cylinder valves, for example, whether the engine is in a VDE or non-VDE mode of operation. Based on the output of the feedback control loop, VCT phaser settings may be appropriately adjusted. For example, the phasing rate, the duty cycle, and/or the null position of the VCT phaser may be appropriately adjusted responsive to valve activation/deactivation conditions. In one example, the duty cycle command may be adjusted more aggressively when the engine is in a VDE mode of operation, to compensate for the slower movement of the cams. In another example, the null position may be adjusted to a lower duty cycle when the engine is in a non-VDE mode of operation. By adjusting VCT phaser commands responsive to the VDE mode of the engine, disturbances may be better rejected and controller stability may be further increased, particularly during VDE/non-VDE transitions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
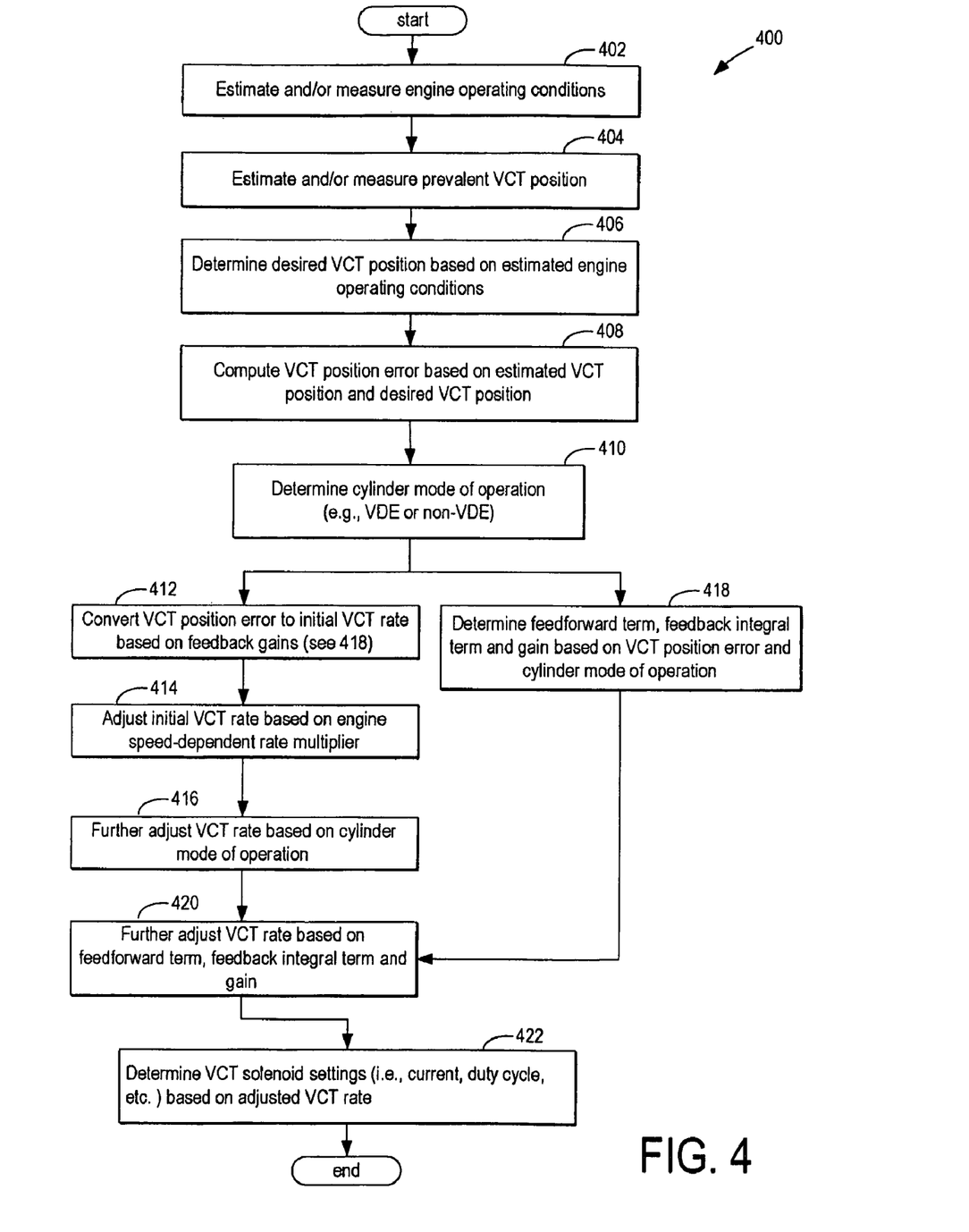
FIG. 4 shows a high level flow chart for adjusting a VCT phaser command responsive to engine operating conditions including a VDE/non-VDE cylinder mode, according to the present disclosure.
Figure 5:
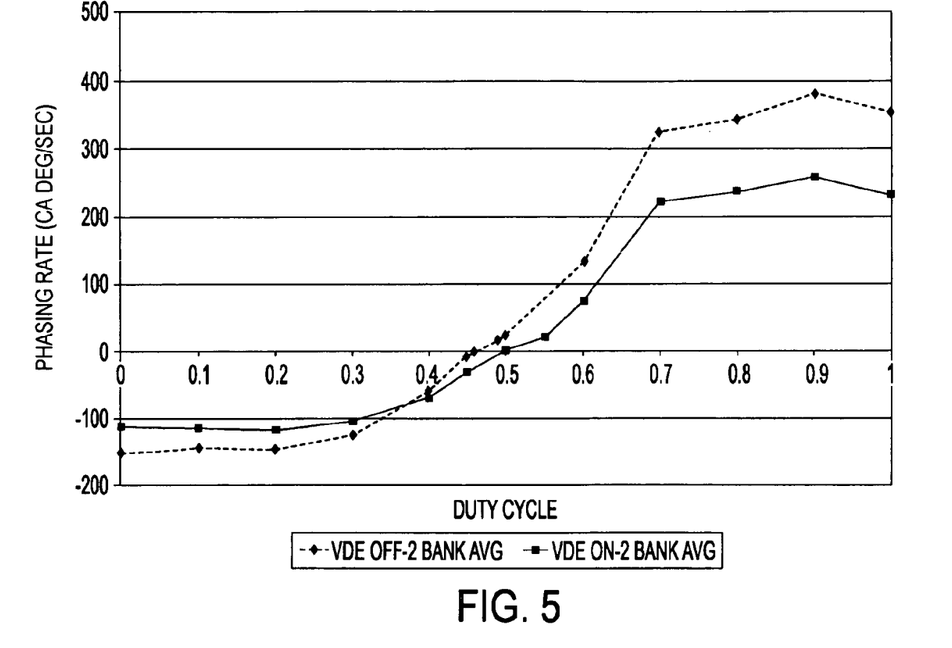
FIG. 5 depicts a prophetic example difference in VCT phaser duty cycle responsive to a VDE/non-VDE cylinder mode.

The following description relates to systems and methods for coordinating variable displacement operation and variable cam timing in a variable displacement engine (VDE). As such, the variable displacement engine (such as the one illustrated in FIGS. 1-2) can switch between operation with all cylinders firing or half the cylinders firing by changing the operation of the intake and exhaust valves of selected cylinders. A cam-torque actuated VCT phaser may be used to adjust the cam timing (such as, an amount of cam retard or cam advance). As illustrated in FIGS. 4-5, the VCT phaser command may be adjusted using a control algorithm to enable feedback control responsive to VCT position errors as well as feed-forward control responsive to engine operating conditions such as an engine speed and a cylinder mode of operation (that is, VDE or non-VDE mode). Further, the feedback control gains may also be adjusted responsive to the cylinder mode of operation. In this way, by adjusting the valve timing command responsive to the VDE mode of operation, cam timing and cylinder activation/deactivation events can be better coordinated to enable smooth cylinder activation/deactivation transitions and reduce phasing disturbances during such transitions. Further improved control of the phasing during both VDE and non-VDE operation can be achieved since the control can compensate for differences in the cam phasing system response caused by operation in VDE versus non-VDE operation.

Figure 1:
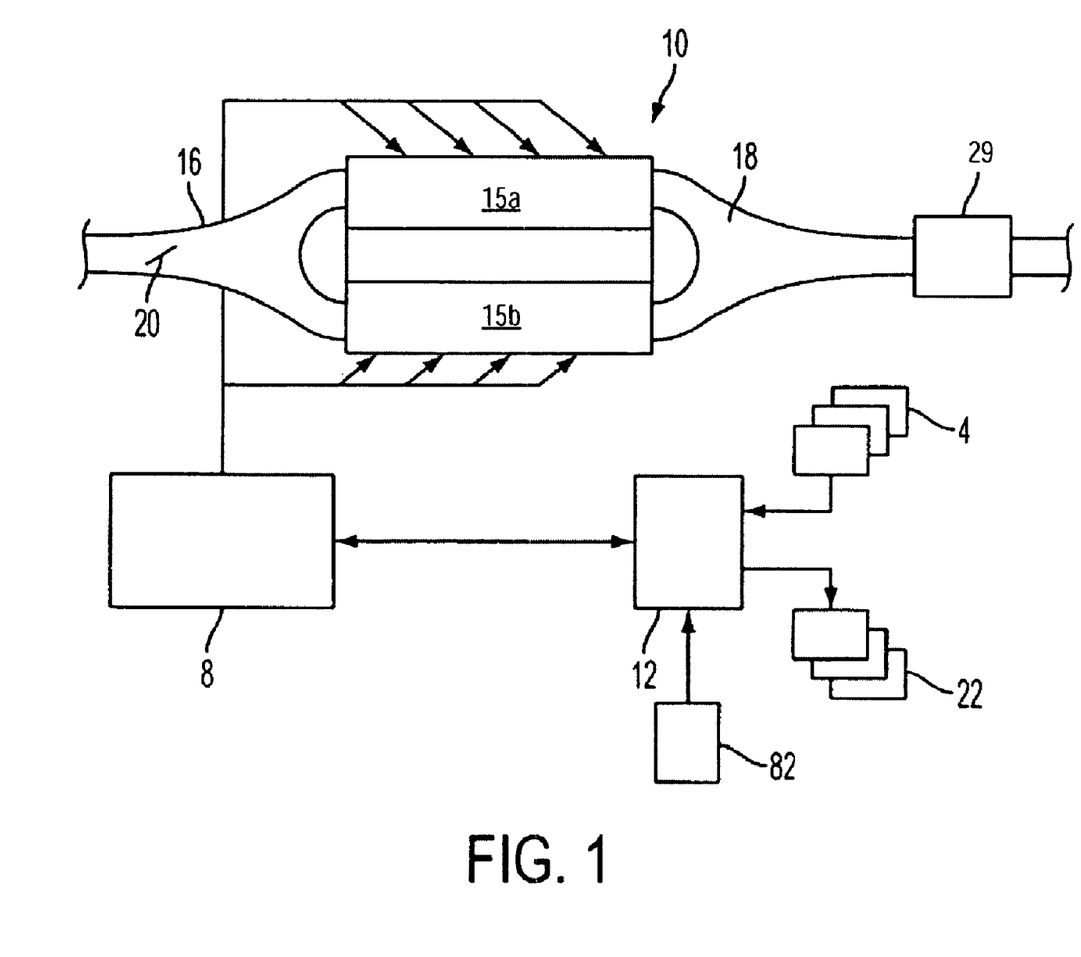
FIG. 1 shows an example engine and exhaust system layout.

FIG. 1 shows an example variable displacement engine (VDE) 10, in which four cylinders (e.g., two in each bank) may have cylinder valves selectively held closed during one or more engine cycles (where an example 4-stroke engine cycle spans 720 crank angle degrees), while the remaining four cylinders (e.g., two in each bank) continue to carry out combustion with cylinder intake/exhaust valves active and operating to open and close. The cylinder valves may be deactivated via hydraulically actuated lifters, or via a cam profile switching (CPS) mechanism in which a cam lobe with no lift is used for deactivated valves. As depicted herein, engine 10 is a V8 engine with two cylinder banks 15a and 15b having an intake manifold 16 (with throttle 20) and an exhaust manifold 18 coupled to an emission control system 29 including one or more catalysts and air-fuel ratio sensors, such as described with regard to FIG. 2.

As noted, in the V8 engine example, a first group of selectively deactivatable cylinders includes two cylinder from bank 15a and two cylinders from bank 15b. Likewise, a second cylinder group that is not selectively deactivatable includes also includes two cylinder from bank 15a and two cylinders from bank 15b, where the two cylinder groups are exclusive of one another such that a specific cylinder is only in one of the groups. Continuing with this example, a bank-specific cam actuator may be used, as describe further with regard to FIG. 2, that adjusts timing of a valve (e.g., intake) on each cylinder in a bank. Thus, in this example, all four cylinders in bank 15a (two in the first group and two in the second group) may have their intake valve opening and/or closing timing adjusted by a common variable cam timing actuator coupled to bank 15a.

In an alternative example, such as a V6 engine, all the cylinders of bank 15a may be selectively deactivatable (e.g., three cylinders), and all the cylinders of bank 15b are not selectively deactivatable (e.g., three cylinders). In this case, a first group of selectively deactivatable cylinders includes all three cylinders of the first bank, and a second cylinder group that is not selectively deactivatable includes also includes all there cylinders of the second bank. Again, continuing with the V6 example, a bank-specific cam actuator may again be used. However, in this example, an actuator coupled in bank 15a adjusts valve timing only of cylinders in the first group.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle. Further, controller 12 may receive an indication of knock from knock sensor 82. Further details of an example cylinder are described with regard to FIG. 2.

Figure 2:
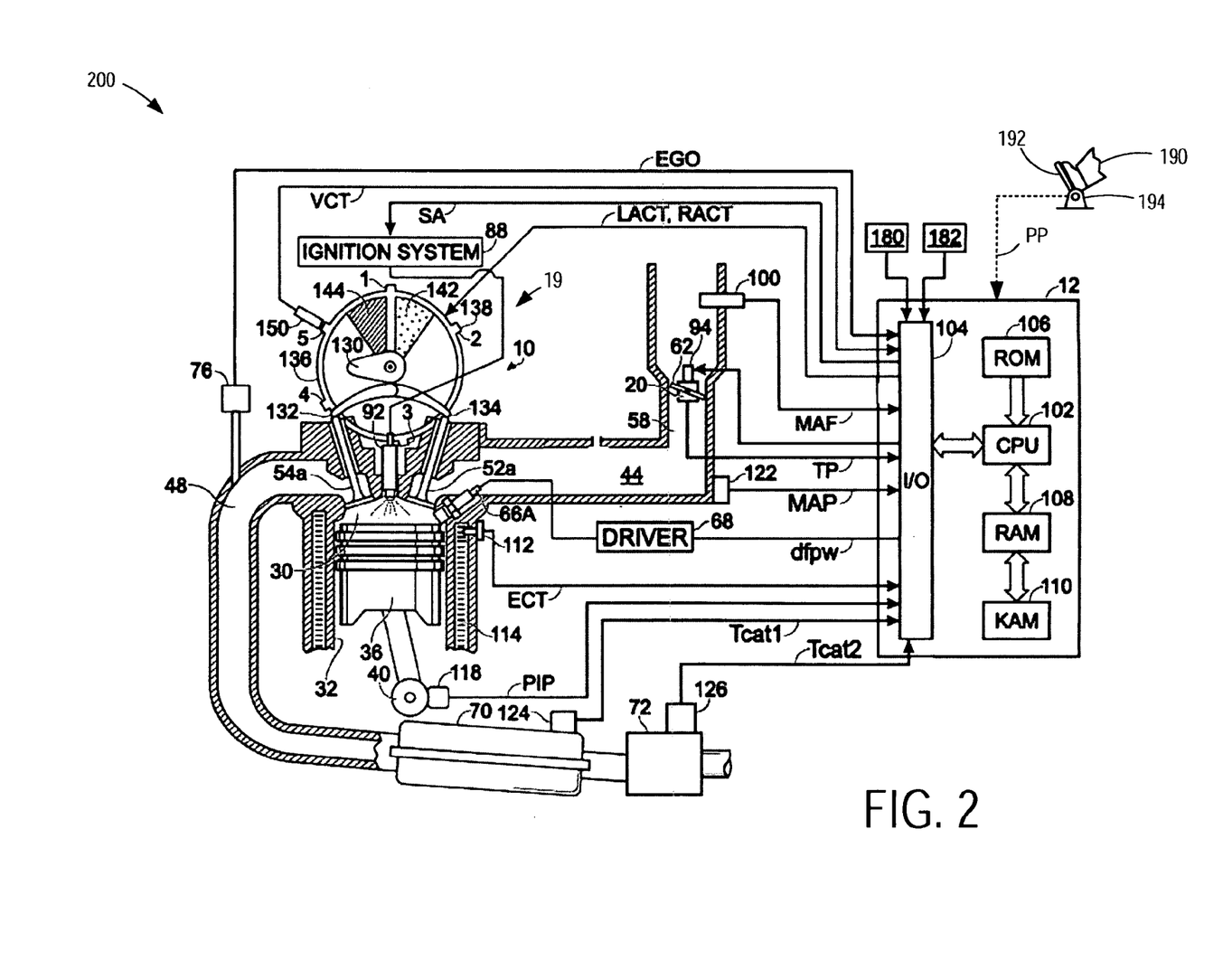
FIG. 2 shows a partial engine view.

FIG. 2 depicts an example embodiment 200 of a combustion chamber or cylinder of internal combustion engine 10. FIG. 2 again shows that engine 10 may receive control parameters from a control system including controller 12, as well as input from a vehicle operator 190 via an input device 192. In this example, input device 192 includes an accelerator pedal and a pedal position sensor 194 for generating a proportional pedal position signal PP.

Cylinder (herein also "combustion chamber") 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Cylinder 30 can receive intake air via intake manifold or air passages 44. Intake air passage 44 can communicate with other cylinders of engine 10 in addition to cylinder 30. In some embodiments, one or more of the intake passages may include a boosting device such as a turbocharger or a supercharger. A throttle 20 including a throttle plate 62 may be provided along an intake passage of the engine for varying the flow rate and/or pressure of intake air provided to the engine cylinders. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Exhaust passage 48 can receive exhaust gases from other cylinders of engine 10 in addition to cylinder 30. Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. Emission control device 72 is shown positioned downstream of catalytic converter 70. Emission control device 72 may be a three-way catalyst, a NOx trap, various other emission control devices or combinations thereof.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including a fuel injector 66A coupled to the fuel system (8, FIG. 1). Fuel injector 66A is shown coupled directly to cylinder 14 for injecting fuel directly therein in proportion to the pulse width of signal dfpw received from controller 12 via electronic driver 68. In this manner, fuel injector 66A provides what is known as direct injection (hereafter also referred to as "DI") of fuel into combustion cylinder 30.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle 20; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 94; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature $T_{cat1}$ of catalytic converter 70 is provided by temperature sensor 124 and temperature $T_{cat2}$ of emission control device 72 is provided by temperature sensor 126. In an alternate embodiment, temperature Tcat1 and temperature Tcat2 may be inferred from engine operation.

Continuing with FIG. 2, a variable camshaft timing system 200 is shown. Specifically, camshaft 130 of engine 10 is shown communicating with rocker arms 132 and 134 for actuating intake valves 52a, 52b and exhaust valves 54a, 54b. VCT system 200 may be oil-pressure actuated (OPA), cam-torque actuated (CTA), or a combination thereof. By adjusting a plurality of hydraulic valves to thereby direct a hydraulic fluid, such as engine oil, into the cavity (such as an advance chamber or a retard chamber) of a camshaft phaser 19, valve timing may be changed, that is advanced or retarded. As further elaborated herein, the operation of the hydraulic control valves may be controlled by respective control solenoids. Specifically, an engine controller may transmit a signal to the solenoids to move a valve spool that regulates the flow of oil through the phaser cavity. As used herein, advance and retard of cam timing refer to relative cam timings, in that a fully advanced position may still provide a retarded intake valve opening with regard to top dead center, as just an example.

Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, dual equal variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 may be used for measurement of cam timing and are equally spaced (for example, in a V-8 dual bank engine, spaced 90 degrees apart from one another) while tooth 5 is preferably used for cylinder identification. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

As described above, FIG. 2 merely shows one cylinder of a multi-cylinder engine, and that each cylinder has its own set of intake/exhaust valves, fuel injectors, spark plugs, etc.

Figure 3:
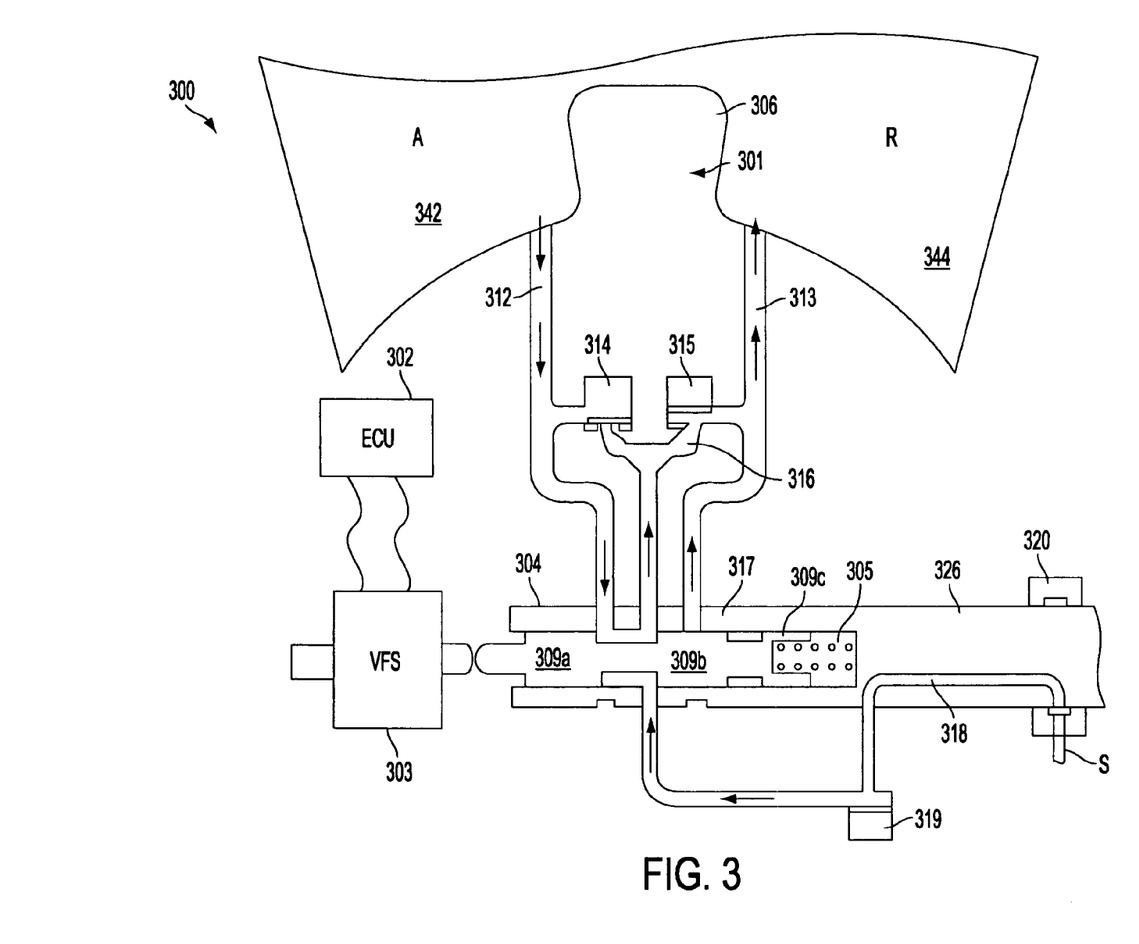
FIG. 3 shows an example cam torque actuated VCT phaser.

FIG. 3 shows an example embodiment of a variable cam timing actuator, which in this example is a cam-torque actuated VCT phaser 300 which may be coupled in a hydraulic system of engine 10 as already noted. The hydraulic system may include the VCT phaser 300, as well as a hydraulic spool valve 304.

Cam-torque actuated (CTA) phasers use torque reversals of the camshaft 320 (caused by interaction with intake/exhaust valves) to move a phaser vane against a return spring, which in one example biases the actuator to a fully advanced position. Spool valves (or control valves) may be present to allow fluid to flow between advance and retard chambers, causing the vane to move. Alternatively, the spool valves may prevent the flow of fluid between the chambers (null position), holding the vane in a desired position (that is, in one example, a desired timing). As such, CTA phasers may provide sufficient response times and allow sufficiently low engine oil usage, thereby improving engine fuel consumption and emissions.

The CTA phaser 300 may have hydraulic input, such as engine oil input, to make up for losses incurred due to oil leakage during phaser operation. However, in contrast to oil-pressure actuated phasers, the CTA phaser may not use the engine oil pressure to move the phaser. Advance chamber 342 and retard chamber 344 may be arranged to resist positive and negative torque pulses in camshaft 320 and may be alternately pressurized by the cam torque. Spool valve 304 allows phaser vane 306 to move, by permitting fluid flow from advance chamber 342 to retard chamber 344 or vice versa, depending on the desired direction of movement (that is, depending on whether a cam advance or a cam retard is desired). Positive cam torsionals, (as depicted by counter-clockwise arrow 301) may be used to retard the phaser while negative cam torsionals (not shown) may be used to advance the phaser. A null or central position (not shown) may be used to stop the flow of fluid, holding vane 306 in a desired position.

Spool valve 304 is shown internally mounted within rotor 326 and includes a sleeve 317 for receiving a spool 309 with spool lands 309a, 309b, 309c and a biasing spring 305. A variable force solenoid (VFS) 303, controlled by electronic control unit (ECU) 302 (which may be controller 12), moves spool 309 within sleeve 317. In moving towards the retard position, as illustrated in the depicted example, the force of the VFS 303 may be reduced and spool 309 may be moved to the left by spring 305, until the force of the spring is balanced by the force of the VFS 303. In the depicted position, spool land 109a blocks hydraulic line 313, while hydraulic lines 312 and 316 are left open. Consequently, the camshaft torque pressurizes the advance chamber 342, causing fluid in the advance chamber to move into the retard chamber 344. Fluid exiting the advance chamber 342 moves through hydraulic line 312 into spool valve 304 between spool lands 309a and 309b. From here, the fluid moves back into hydraulic line 316 where it feeds into hydraulic line 313 through open check valve 315, thereby supplying fluid to the retard chamber 344. In this way, positive cam torsionals are used to move the phaser vane 306 in a direction of cam retard.

In contrast, to provide a cam advance, the force of the VFS 303 may be increased and the spool may be moved to the right (not shown), until the force of the spring balances the force of the VFS 303. In this position, spool land 109a blocks the exit of fluid from hydraulic line 312, while hydraulic lines 313 and 316 are left open. Consequently, the camshaft torque pressurizes the retard chamber 344, causing fluid in the retard chamber to move into the advance chamber 342. Fluid exiting the retard chamber 344 then moves through hydraulic line 313 and into spool valve 304 between spool lands 309a and 309b. From here, the fluid enters hydraulic line 316 and travels through open check valve 314 into hydraulic line 312, thereby supplying fluid to advance chamber 342. In this way, negative cam torsionals are used to move the phaser vane 306 in a direction of cam advance.

Once a desired cam position has been attained, the cam position may be maintained by adjusting the phaser to a null or central position wherein the spool lands 309a and 309b block hydraulic lines 312 and 313, respectively, thereby locking vane 306 into a fixed position.

Make-up oil is supplied to the phaser 300 from oil supply S to make up for oil losses incurred due to leakage during phaser operation. Make-up oil enters the phaser at hydraulic line 318 and moves through inlet check valve 319 to enter spool valve 304. From the spool valve, the make-up oil enters hydraulic line 316 through either of check valves 314 and 315, depending on which is open, to enter either the advance chamber 342 or the retard chamber 344.

Since CTA phasers use torque reversals caused by the forces of opening and closing engine valves to move the phaser vane, the inventors herein have recognized that the phaser dynamic and static response, and hence the cam timing, may be affected by the number of engine valves that are opening or closing, as well as any changes in the number of active valves. That is, the net torque experienced by the cam phaser may be affected based on whether a cylinder is in a VDE or non-VDE mode. Further still, the net torque experienced may be affected during VDE transitions. As one example, the cam advance and/or retard rate may vary depending on whether the engine is operating in a VDE or non-VDE mode, where in one example a slower valve timing response is achieved in VDE mode compared with non-VDE mode (since there are fewer torque reversals due to fewer valve events on the camshaft).

Thus, as further elaborated with reference to FIG. 4, during the determination of a VCT command, including the determination of a VCT solenoid current and/or duty cycle, an engine controller may be configured to supplement feedback control from VCT position errors with feed-forward and/or feedback control adjustments regarding the VDE mode of the cylinder valves, to thereby enable the VCT and VDE functions of an engine to be better coordinated.

FIG. 4 depicts an example routine 400 that may be executed by an engine controller during the determination of a VCT command in a cam-torque actuated VCT system to compensate for position errors that may arise due to differences in torque arising due to differences in the number of active/inactive cylinder valves.

Specifically, during control of variable cam timing, the inventors herein have recognized that at a constant commanded cam position, VCT position may be disturbed during VDE valve state transitions. While higher gains may help improve disturbance rejection during such transitions, higher gains during other operating conditions, such as non-VDE operation, may decrease controller stability. Further, as noted above, in the example of a cam torque actuated system the system response changes depending on whether the cylinder mode of operation is VDE versus non-VDE operation due to changes in motive force on the cam phaser (e.g., the variable cam timing system response is slower in VDE). Further still, comparing the null (holding) duty cycle to maintain a given cam phasing in activated (Non-VDE) to deactivated valve (VDE) conditions shows that a higher duty cycle results for VDE conditions. As such, the control of the variable camshaft timing actuator (e.g., actuator 300) may be adjusted (e.g., via spool valve 304) to compensate for these effects.

For example, in one example, during non-VDE operation, the control system may adjusting the hydraulic system with a first gain based on cam timing feedback information as compared to a desired cam timing, and during VDE operation, adjust the hydraulic system with a second (higher) gain based on cam timing feedback information compared to the desired cam timing.

Specifically, FIG. 5 shows a prophetic example of the characterization of phasing rate versus duty cycle at one oil temperature, and engine speed for two valve states (VDE and non-VDE). In this example, the characterization is different by valve state and non-linear in either case.

Therefore, returning to method 400, at 402, the method includes measuring and/or estimating the engine operating conditions. The conditions assessed may include barometric pressure, a driver-demanded torque (for example, from a pedal-position sensor), manifold pressure (MAP), manifold air flow (MAF), an approximate amount of residuals left over in the cylinder(s) from the previous combustion cycle, engine temperature, air temperature, knock limits, etc. At 404, the prevalent VCT position may be determined. This may include determining a cam timing, a cam phase, etc. At 406, a desired VCT position may be determined based on the estimated engine operating conditions. Further, the desired VCT may also be determined responsive to whether or not the engine is operating in a VDE mode or a non-VDE mode. At 408, a VCT position error may be computed based on the estimated VCT position and the desired VCT position. In one example, the error may include a difference between the estimated VCT position and the desired VCT position.

Continuing with FIG. 4, at 410, the routine determines a current cylinder mode of operation (e.g., VDE or non-VDE). Further, the routine may determine whether a transition in modes is currently, or imminently, scheduled.

Next, at 412, the routine converts VCT position error to an initial desired VCT rate (e.g., rate of change of actuator position/cam timing based on a conversion, such as a calibratable table. At 414, the routine adjusts the initial VCT rate based on an engine speed-dependent rate multiplier, which in one example increases the desired initial rate at higher engine speeds Then, at 416, the routine further adjusts the VCT rate based on the determined cylinder mode of operation, for example increasing the rate for VDE as compared to Non-VDE operation. Similarly, at 418, the routine determine a feedback integral term and gain term based on VCT position error and cylinder mode of operation. For example, the routine may increase one or both when operating in the VDE mode as compared to the non-VDE mode of operation. In one example, the routine may set the control gains higher during the VDE mode as compared to the non-VDE mode. For example, a proportional gain applied to a VCT error may be higher during VDE operation.

In another example, the routine may determine a feedforward null holding position based on the cylinder mode of operation, where the control signal sent to spool valve 304 is adjusted within a first range during non-VDE operation to maintain the null position of the hydraulic actuator, and the signal being within a second range during VDE operation to maintain the null position of the hydraulic, the second range higher than the first range, and the second range non-overlapping from the first value range. As shown in FIG. 4, a single null holding duty cycle may also be used, the null duty cycle signal being a higher duty cycle in the VDE mode (e.g., 0.5) as compared to the non-VDE mode (e.g., 0.46). Further, the feedforward term may be adjusted in response to a transition in the cylinder mode (e.g., increased in VDE operation).

As noted herein, in one example, during VDE operation, the cam torque actuated variable cam timing system exhibits a slower response (and thus a higher feedback gain is provided as noted above), as well as a higher null holding duty cycle, as illustrated in FIG. 5, as least for some duty cycles. However, in other conditions, the feedback control gains and/or null holding value may be reduced for VDE operation as compared to non-VDE operation. Also, in this example, a higher duty cycle refers to adjusting the duty cycle in a direction that moves the solenoid to increase oil flow to an retard chamber thus further retarding the cam timing away from the base timing and against the biasing spring, whereas a reduced duty cycle (e.g., zero) would result in the actuator returning, via the spring, to the base advanced timing.

Next, at 420, the routine still further adjusts the VCT rate based on the feedforward, feedback integral term and gains from 428. Then, at 422, the routine determines the VCT solenoid control signal settings (e.g, current, duty cycle, etc.) based on adjusted VCT rate using a transfer function, such as a calibratable table. Further, the control signal may be adjusted responsive to a transition of the first group of cylinders, where the signal is adjusted differently when transitioning cylinders of the first group from deactivated to activated cylinder, as compared to when transitioning cylinders of the first group from activated to deactivated cylinder. For example, a feedforward component of the control signal may be increased when transitioning to VDE operation, and decreased when transitioning from VDE operation.

In this way, it is possible to adjust the control signal sent to the spool valve, and thus adjust the control of the hydraulic cam torque actuator, responsive to the engine cylinder valve deactivation, including taking into account differences in null holding position, differences in dynamic response, and disturbances generated in the variable cam timing caused by transitions in the cylinder valve deactivation mode.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of controlling an engine, the engine including a first group of cylinders having selectively deactivatable cylinders valves, the engine further including a variable camshaft timing actuator coupled in a hydraulic system, the method comprising:
   during a first mode of engine operation where the first group of cylinders is activated to carry out combustion cycles, adjusting the hydraulic system with a first gain based on cam timing feedback information; and
   during a second mode of engine operation where the first group of cylinders is deactivated, adjusting the hydraulic system with a second gain based on cam timing feedback information, the second gain higher than the first gain.

2. The method of claim 1, wherein the engine further includes a second group of cylinders without selective deactivatable cylinder valves, the method further comprising carrying out combustion cycles in the second group of cylinders during the first and second modes.

3. The method of claim 2, wherein the hydraulic system includes a hydraulic spool valve coupled to the variable camshaft timing actuator, the variable camshaft timing actuator being a hydraulic actuator, the method further comprising sending a control signal to a solenoid coupled to the hydraulic spool valve, the signal being within a first range during the first mode to maintain a null position of the hydraulic actuator, and the signal being within a second range during the second mode to maintain the null position of the hydraulic actuator, the second range non-overlapping from the first range.

4. The method of claim 3, wherein the cam timing feedback information includes a position of the hydraulic actuator.

5. The method of claim 4, wherein the control signal is adjusted responsive to the first gain during the first mode, and responsive to the second gain during the second mode.

6. The method of claim 1, wherein the hydraulic actuator actuates a timing of a camshaft, the camshaft actuating cylinder valves of both the first and second group of cylinders.

7. The method of claim 1, wherein the hydraulic actuator actuates a timing of a camshaft, the camshaft actuating cylinder valves of only the first group of cylinders.

8. A method of controlling an engine, the engine including a first group of cylinders having selectively deactivatable cylinders valves and a second group of cylinders without selectively deactivatable cylinders valves, the engine further including a hydraulic variable camshaft timing actuator coupled in a hydraulic system, the hydraulic system including a spool valve coupled to the hydraulic variable camshaft timing actuator, the spool valve actuated by a solenoid, the method comprising: during a first mode of engine operation where the first and second groups of cylinders are activated to carry out combustion cycles, maintaining a null position of the hydraulic variable camshaft timing actuator by adjusting a control signal to the solenoid to within a first value range; and during a second mode of engine operation where the first group of cylinders is deactivated and the second group of cylinders carries out combustion cycles, maintaining the null position of the hydraulic actuator by adjusting the control signal to within a second value range; wherein during the first mode, the method includes adjusting the control signal to the solenoid with a first feedback control gain based on cam timing feedback information and during the second mode adjusting the control signal with a second feedback control gain based on cam timing feedback information, the second gain higher than the first gain.

9. The method of claim 8, wherein the control signal is adjusted responsive to the first gain during the first mode, and responsive to the second gain during the second mode.

10. The method of claim 9, wherein the hydraulic variable camshaft timing actuator actuates a timing of a camshaft, the camshaft actuating cylinder valves of both the first and second group of cylinders.

11. The method of claim 9, wherein the hydraulic actuator actuates a timing of a camshaft, the camshaft actuating cylinder valves of only the first group of cylinders.

12. The method of claim 9, further comprising determining a desired cam timing setting for the hydraulic variable camshaft timing actuator responsive to whether or not the first group of cylinders is deactivated.

13. The method of claim 12, wherein deactivating the first group of cylinders includes holding closed all intake and exhaust valves of each cylinder of the first group for each stroke of the cylinder for a plurality of cycles of the cylinders of the first group.

14. The method of claim 13, further comprising adjusting the control signal responsive to a transition of the first group of cylinders, where the signal is adjusted different when transitioning cylinders of the first group from deactivated to activated cylinder, as compared to when transitioning cylinders of the first group from activated to deactivated.

15. The method of claim 14, wherein the adjusting responsive to the transition includes adjusting a feedforward component of the control signal.

16. A method of controlling an engine, the engine including a first group of cylinders having selectively deactivatable cylinders valves and a second group of cylinders without selectively deactivatable cylinders valves, the engine further including a hydraulic variable camshaft timing actuator coupled in a hydraulic system, the hydraulic system including a spool valve coupled to the hydraulic variable camshaft timing actuator, the spool valve actuated by a solenoid, the method comprising:
  during a first mode of engine operation where the first and second groups of cylinders are activated to carry out combustion cycles, adjusting a control signal to the solenoid with a first feedback control gain based on cam timing feedback information and further maintaining a null position of the hydraulic variable camshaft timing actuator by further adjusting the signal to within a first value range; and
  during a second mode of engine operation where the first group of cylinders is deactivated and the second group of cylinders carries out combustion cycles, adjusting the control signal with a second feedback control gain based on cam timing feedback information and further maintaining the null position of the hydraulic actuator by further adjusting the signal to within a second value range, the second gain higher than the first gain, and the second range greater than the first range.

17. The method of claim 16, wherein deactivating the first group of cylinders includes holding closed all intake and exhaust valves of each cylinder of the first group for each stroke of the cylinder for a plurality of cycles of the cylinders of the first group.

18. The method of claim 17, wherein the hydraulic variable camshaft timing actuator actuates a timing of a camshaft, the camshaft actuating cylinder valves of both the first and second group of cylinders.

19. The method of claim 17, wherein the hydraulic variable camshaft timing actuator actuates a timing of a camshaft, the camshaft actuating cylinder valves of only the first group of cylinders.

* * * * *